(12) United States Patent
Amacker

(10) Patent No.: US 9,195,723 B1
(45) Date of Patent: *Nov. 24, 2015

(54) EVOLUTIONARY CONTENT DETERMINATION AND MANAGEMENT

(71) Applicant: A9.com, Inc., Palo Alto, CA (US)

(72) Inventor: Matthew Warren Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,098

(22) Filed: Jan. 13, 2014

Related U.S. Application Data

(63) Continuation of application No. 12/748,125, filed on Mar. 26, 2010, now Pat. No. 8,631,029.

(51) Int. Cl.
*G06F 17/30* (2006.01)

(52) U.S. Cl.
CPC ...... *G06F 17/30554* (2013.01); *G06F 17/3005* (2013.01); *G06F 17/30244* (2013.01)

(58) Field of Classification Search
CPC .................................................. G06F 17/3005
See application file for complete search history.

(56) References Cited

U.S. PATENT DOCUMENTS

| | | |
|---|---|---|
| 2002/0065813 A1 | 5/2002 | Scanlon et al. |
| 2003/0011702 A1 | 1/2003 | Ohmura et al. |
| 2003/0123737 A1 | 7/2003 | Mojsilovic et al. |
| 2007/0043706 A1 | 2/2007 | Burke et al. |
| 2009/0187558 A1 | 7/2009 | McDonald |
| 2009/0216760 A1 | 8/2009 | Bennett |

OTHER PUBLICATIONS

Jing et al., IGroup, MM'06, 2006.

*Primary Examiner* — William Spieler
(74) *Attorney, Agent, or Firm* — Hogan Lovells US LLP

(57) ABSTRACT

A visual refinement interface enables users to adjust and/or refine search results by selecting results that match a user's interest, and displaying subsequent results that are closer to the selected items. Multiple result sets can be displayed concurrently such that the user can maintain context for the results. Further, the user can quickly go back to modify an earlier selection without having to navigate to a previous page, for example, and a single modification can cause several subsequent result sets to automatically change such that the user can quickly view dozens of new results, for example, simply by selecting at least one different result from a displayed result set. Prior result sets can be modified, such as by reducing the size or adjusting the placement of the sets, such that the user can easily determine the current set and the relatedness to previous results sets.

20 Claims, 9 Drawing Sheets

EVOLUTIONARY CONTENT DETERMINATION AND MANAGEMENT

CROSS REFERENCE TO RELATED APPLICATION

This application is a Continuation of, and accordingly claims the benefit of, allowed U.S. patent application Ser. No. 12/748,125, filed with the U.S. Patent and Trademark Office on Mar. 26, 2010, which is hereby incorporated herein by reference.

BACKGROUND

As an ever-increasing amount of information is being made available electronically, typically over networks such as the Internet, it is increasingly difficult to locate information or other content that is of interest to a user. Many conventional systems utilize search engines that accept keywords or other types of queries from a user, and return results related to the query. Oftentimes users do not enter precise queries, which results in the set of results being over-inclusive, forcing the user to navigate through many search results before locating the items of interest. In other conventional systems, users are able to browse through information, such as by navigating through several levels of categories or pages of electronic catalogs. The user is typically only able to see one page or category at a time, which can make it difficult or at least time consuming to navigate the various options.

Conventional approaches also can be difficult for a user when the user navigates to a set of results or content that ends up not being of interest for the user. In many cases, the user must either enter a new query, or back track a number of pages or levels to attempt to get to a point where the user can again move in the desired direction. Such an approach is not intuitive, and can result in a significant amount of wasted time or frustration on the part of the user. For content providers who offer items for consumption, such as products offered through an electronic marketplace, this frustration may prevent a customer from quickly locating products of interest, which can result in lost sales and lesser repeat business.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to locating and/or providing content in an electronic environment. In particular, various embodiments provide a visual refinement interface that enables a user to refine search results simply by selecting one or more search results currently being displayed to the user. Any prior search result sets may be displayed on the same screen, page, etc., as the new search result set, but may be altered in appearance. For example, prior search result sets may be reduced in size or adjusted in appearance (e.g., having a different color, color depth, transparency, or other rendering aspect applied) to differentiate the previously-generated search results from the new search result set. By displaying the various result sets concurrently, the user can maintain context of any prior search refinements and easily return to prior search results.

Figure 1:
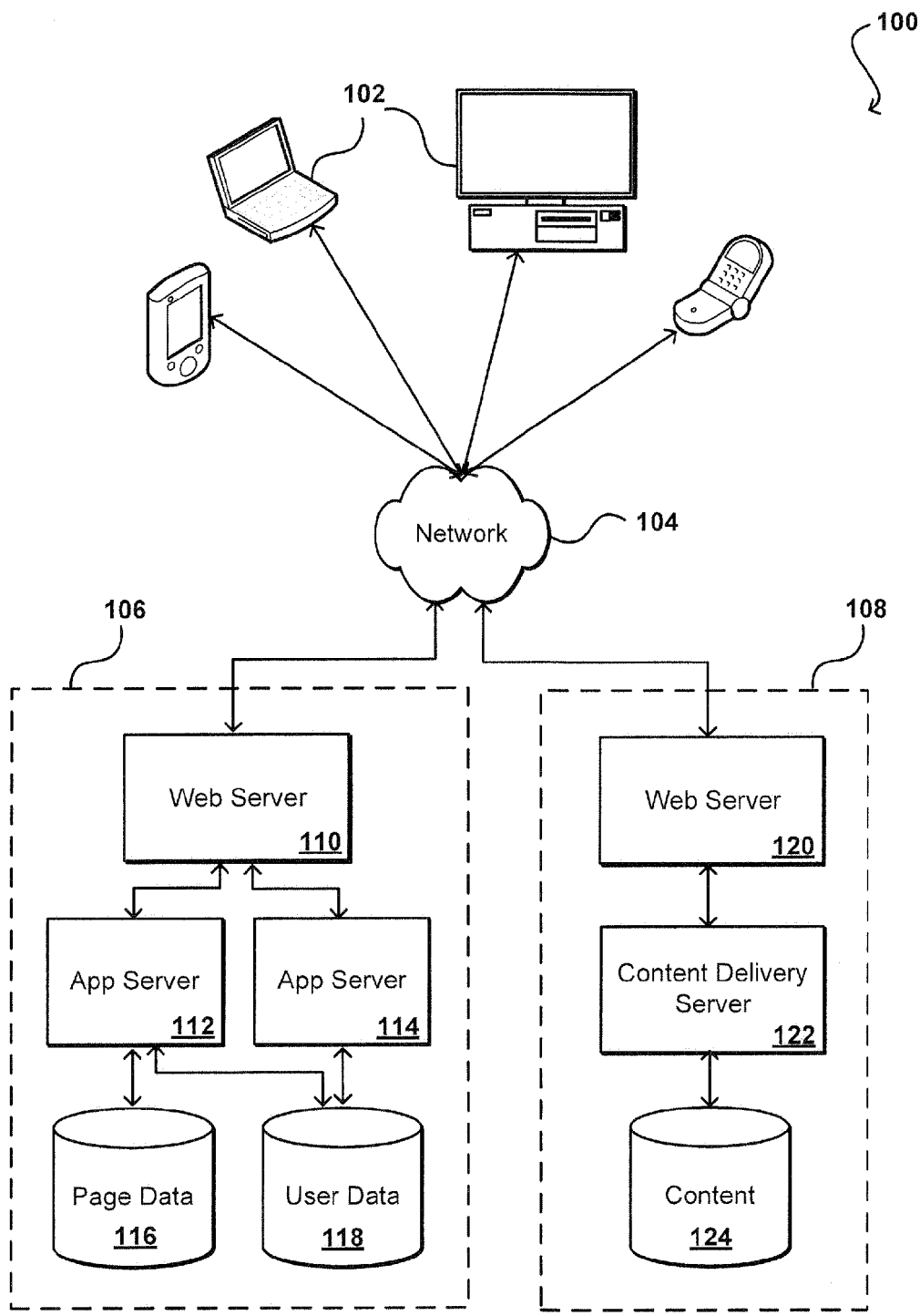
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes a variety of electronic client devices 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 104.

The network 104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 106 and a supplemental content provider 108. Each provider can include at least one Web server 106 for receiving requests from a user device 102 and serving content in response thereto, although for other networks an alternative device serving a similar purpose could be used as would be apparent to one of ordinary skill in the art.

Each content provider in this illustrative environment includes at least one application server 112, 114, 122 or other such server in communication with at least one data store 116, 118, 124. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 116 illustrated includes mechanisms for storing page data useful for generating Web pages and the user information data store 118 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 102. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2A:
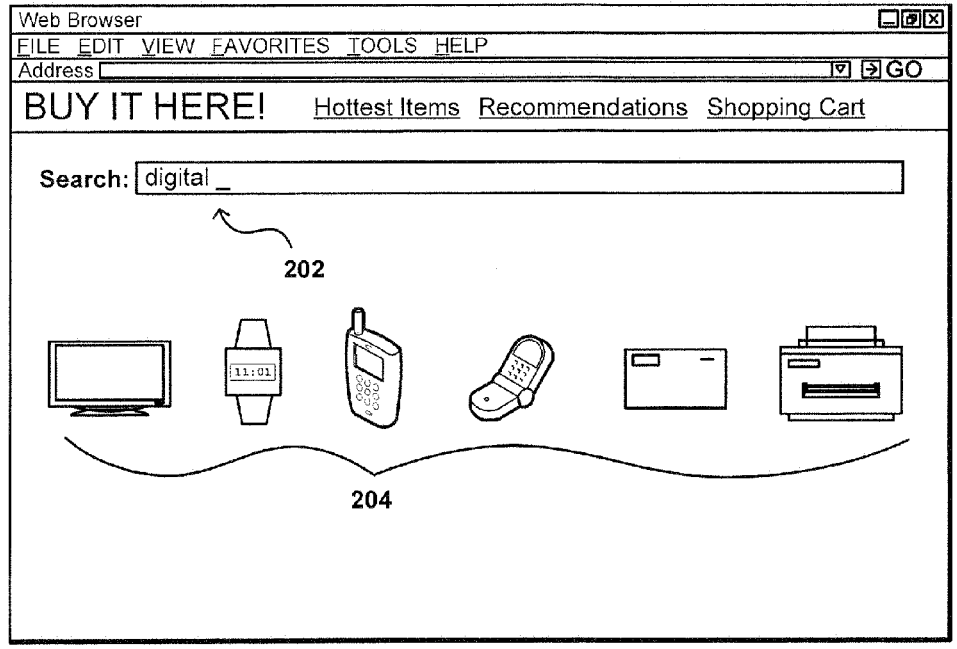
FIGS. 2(a) and 2(b) illustrate examples of a dynamic display of content that can be provided in accordance with various embodiments.

FIG. 2(a) illustrates an example of an interface and/or display 200 that can be provided to an end user, using a system such as that described with respect to FIG. 1, in accordance with at least one embodiment. This particular display page is shown to be rendered in a browser or similar application, but it should be understood that the content can be rendered and/or presented using any appropriate approach known or subsequently developed for such purposes. Further, various embodiments are described with respect to offering products through an electronic marketplace, but it should be understood that any appropriate content offered for display to a user can be utilized in accordance with the various embodiments, and that such examples should not be viewed as limitations on the claimed embodiments unless otherwise specified.

The interface 200 shown in FIG. 2(a) enables a user to search for information by entering one or more keywords into a search box 202 or similar search-related element. In conventional systems, a user would typically enter a full query and then select a "submit" button or similar option to receive results. In other conventional systems, a user might receive auto-complete options as the user enters keywords into the search box 202 that can be selected and submitted to search for information.

Systems in accordance with various embodiments discussed herein can provide search results with sufficient speed and minimal latency, such that search results can be returned as the user enters information in the search box 202 (e.g., in real-time). In FIG. 2(a), a user is in the process of entering the query "digital camera" in the search box 202. Search results 204 may be returned (e.g., displayed) to the user as the user is typing the query. In some embodiments, search results are displayed as soon as the user types one or two characters into the search box. An active scripting language, such as JavaScript, or other such client-side script, can capture each character or action submitted by the user and cause an appropriate request to be generated automatically. By returning search results in such a manner, the user is not required to select a "submit" button to begin a search.

FIG. 2(a) illustrates that a number of items matching the term "digital" are displayed upon the user entering the term "digital" in the search box. The number of items displayed in the interface can vary, and may be dependent upon factors such as screen resolution, type of image or content, etc. Using the example provided above where the user is searching for a digital camera, the user could stop typing in the search box after "digital" because the interface shown in FIG. 2(a) includes a digital camera in the set of search results based on the term "digital." If, however, the interface 200 did not display the item the user is looking for after typing "digital," the user can continue to type the rest of the query into the search box until either the desired item is displayed or the user finishes the query. As should be understood, the search results displayed in the interface can change each time a user adds, changes, or deletes at least one character in the search box.

Figure 2B:
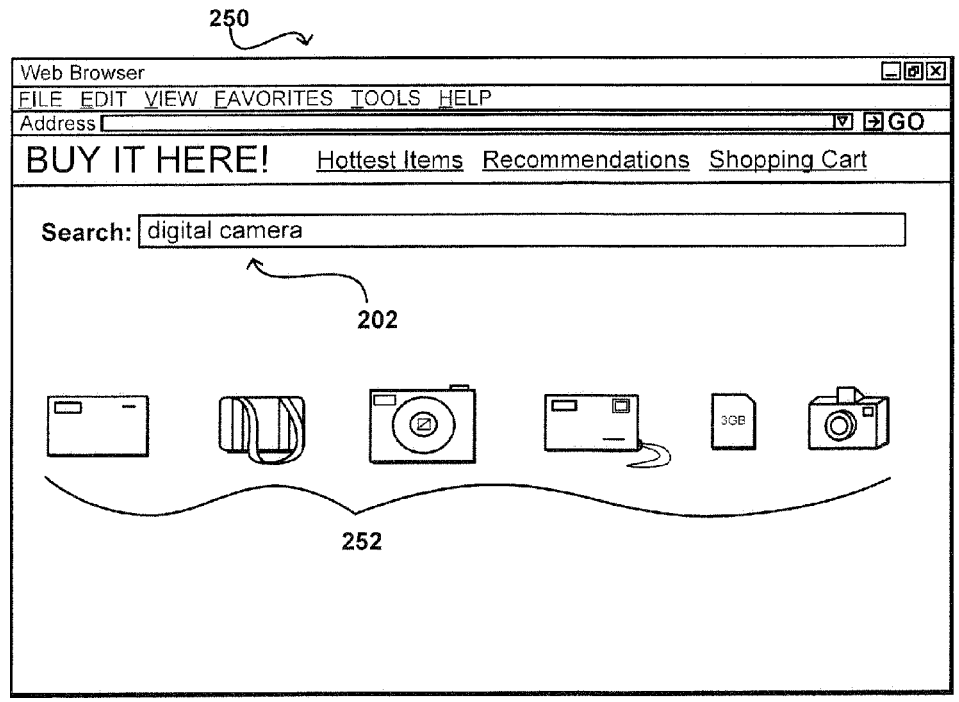

FIG. 2(b) shows an example subsequent state of the display 250 after the user has typed or otherwise entered the full query "digital camera" into the search box. As can be seen, a new set of search results 252 (relative to the state of FIG. 2(a)) is displayed to the user as a result of the additional term "camera" in the query. In this example, an image is shown for each search result, and the search results are presented in a substantially linear fashion, although various other types of search result and organizational approaches can be used as taught or suggested herein. By providing the search results as an array of images, for example, the user can quickly select the item that the user is looking for (or is most closely related to).

In some embodiments, the leftmost image, which is a digital camera in FIG. 2(b), is the most relevant search result for which the user is searching. In other embodiments, search results are displayed in response to a search query based at least in part upon the type of item, in addition to the relatedness of the item to the query. For example, the search results 252 displayed in response to the query "digital camera" can include different types of cameras, such as pocket cameras, SLR cameras, high resolution cameras, etc., as well as types of digital camera-related items, such as memory cards, camera cases, etc. Displaying camera related items would allow the user to select a camera case instead of requiring the user to type in a full query such as "digital camera carrying case" or a similar query.

Figure 3A:
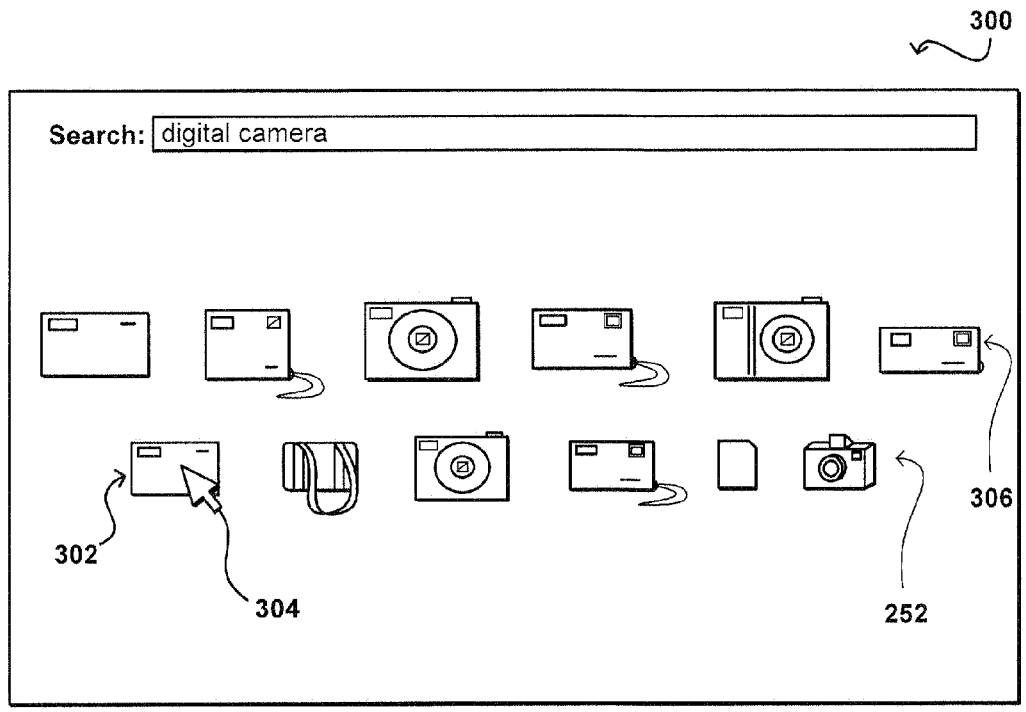
FIGS. 3(a) and 3(b) illustrate examples for displaying additional related content in accordance with various embodiments.

FIG. 3(a) illustrates an example of a display 300 that can be presented to the user in response to the user selecting an item displayed in the initial search results, here by positioning a cursor 304 (using any appropriate technique) to select an item 302 (a digital camera) from the initial set of search results. In this embodiment, the system utilizes the selection of item 302 in searching for the next set of search results. The system can utilize any of a number of parameters, variables, categories, types, descriptions, or other such information related to the selection of item 302 to further generate the next set of search results. Using the digital camera example, the system, in some embodiments, displays only cameras in the next set of search results (e.g., no camera accessories). In other embodiments, however, the system may interpret the selection of item 302 as the user might be looking for a specific camera and/or accessories for the camera. Thus, the type of item selected in the first set of search results might only be one factor among many other factors used to generate the next set of search results. In generating the next set of search results, the system can also use other information associated with the selected item such as price range or user rating. Using the example of a digital camera, there also can be specific criteria used to generate the next set of search results, such as resolution, type of optics, type of flash, or other such aspects of a camera.

In some embodiments, the items displayed are based upon criteria or aspects of the selected item(s). For example, if a user selects a computer with a specific processing speed and amount of memory, the system can search for related items with similar processing speeds and memory specifications, etc. In some embodiments, the system can track keywords that are most associated with the selected item, such as may be based on the initial keywords that eventually lead a user to view and/or purchase that item. When a user selects an item as a filtering criterion, for example, at least some of these tracked keywords can be added to the search query as refinements, either on equal footing or as secondary considerations with respect to the initial search criteria. In other embodiments, these keywords can be used to filter or refine the previous set(s) of search results, even though only a portion of those search results might have been shown. In other embodiments, the related items of the next result set can be pulled from other sources, such as items that were viewed and/or purchased when other users viewed the selected item. Thus, the items submitted in a final result set might not relate to an initial search query, or at least might not have been presented as search results for the initial search criteria. Various algorithms also can combine and/or weight information from various sources using any of a number of criteria, such as content categories, types, etc. Further, different sources can have different confidence levels or other indications of accuracy, which can be used to weight or adjust various considerations. In some embodiments, search results can be selected based at least in part upon combined confidence scores. In certain embodiments, a modified query used to generate subsequent result sets can be displayed (or at least displayable) to the user, such that the user can better understand which queries are being executed, etc. Further, by being able to see the queries the user can determine which aspects of a product are used to "refine" the search results, and can add, adjust, or remove criteria as necessary.

FIG. 3(a) illustrates that a second set of search results 306 may be displayed concurrently with the first set of search results 302. In some embodiments, the second set of search results can be a subset of the first set of search results by running the additional criteria from the selected item against search results of the first query. In other embodiments, each selection of an item can cause a new query to be executed such that each subsequent set of search results can include content that was not selected and/or displayed based on a previous query. Using the example shown in FIG. 3(a), the second set of search results 306 displays items that are at least somewhat related to the selected item 302 of the first set of search results. For example, the second set of search results 306 could contain cameras that include flash elements and/or are within a similar price range as the selected item 302.

The second set of search results 306 is displayed more prominently than the first set of search results. The items displayed in the first set of search are smaller than the items displayed in the second set of search results 306. The First set of search results are also displayed below the second set of search results. As will be discussed below, various other display and orientation options can be used and are well within the scope of the various embodiments. In some embodiments, the movement of the first set of search results to the lower position shown in FIG. 3(a), and the resizing of each image in the first set, may be animated. Such animation can help the user to understand the progression of the search results. The animation can be performed using any appropriate technology, but in at least one embodiment is performed using JQuery to perform movements and/or adjustments as instructed by the underlying JavaScript (or other active script) on the page.

Figure 3B:
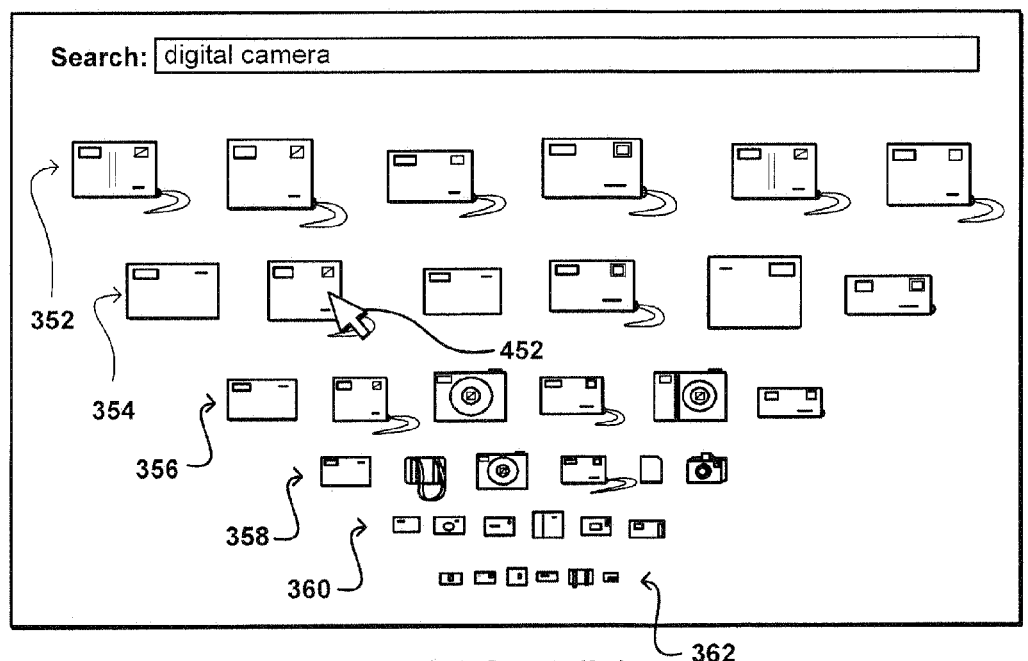

The display 350 of FIG. 3(b) illustrates a state wherein the user has selected an item for each of five different result sets. Display 350 in FIG. 3(b) shows that at least six search result sets have been provided to a user. In this embodiment, every time a new search result set is displayed as the "primary" set, each prior search result set is moved downward in the display 350 and the images within the respective result set are reduced in size. In this embodiment, the order of the search result sets are maintained.

Displaying the search result sets in this manner is advantageous for a number of reasons. In general, displaying the search result sets in this manner allows a user to view their search history on a single webpage. The number of search results sets that may be displayed at one time on a single page is only limited by the size of the display screen. The configuration of FIG. 3(b) is unlike a conventional system, which typically only displays each search result set on a separate page. In some embodiments, the number of search result sets displayed at one time on a single page may be limited to a certain number to prevent displaying search result sets that would likely be too difficult for the user to see or interpret. In other embodiments, the result sets in the current search session are always displayed (e.g., down to a single pixel in size). In some embodiments, the images in the search result sets might only shrink to a minimum viewable size (e.g., ten pixels) after which the search result set will only shift in position on the display.

A popup or modal window can be used when a user "mouses over" or otherwise interacts with an image within a search result set, such that the user can see an enlarged view of a reduced-size item to view additional information, etc. about the particular item. Concurrently displaying multiple search result sets on a single page also provides context to the many result sets including the choices that generated the current search results.

Another advantage of displaying multiple result sets at the same time is that a user can easily return to prior search result sets. For example, a user might select an item in the "primary" search result set that generates a new search result set that does not include any items of interest to the user. In many conventional approaches, the user would have to either navigate back to a previous page or submit a new query to return to the prior search results or obtain a new search result set. Using the example shown in FIG. 3(b), the user can readily see the previous search result sets, and determine either which search result set to return to, or which item to select, simply by selecting one of the items in the set. Upon doing so, a new search "primary" result set is generated.

Figure 4A:
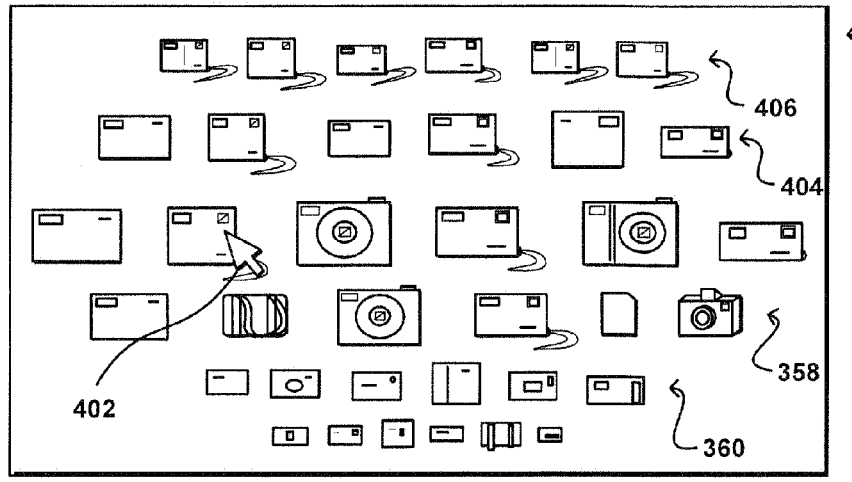
FIGS. 4(a)-4(c) illustrate examples of navigating displayed content in accordance with various embodiments.

FIG. 4(a) shows an example of a display 400 wherein a user has selected an item 402 in a previous result set 356. In this embodiment, the system can adjust the displayed size of the newly selected result set from the reduced size in FIG. 3(b) back to a "primary" result set size to clearly indicate which row of the display is the current result set. In this example, the other search result sets displayed are subsequently reduced in size based upon their distance from the currently selected row 404.

Figure 4B:
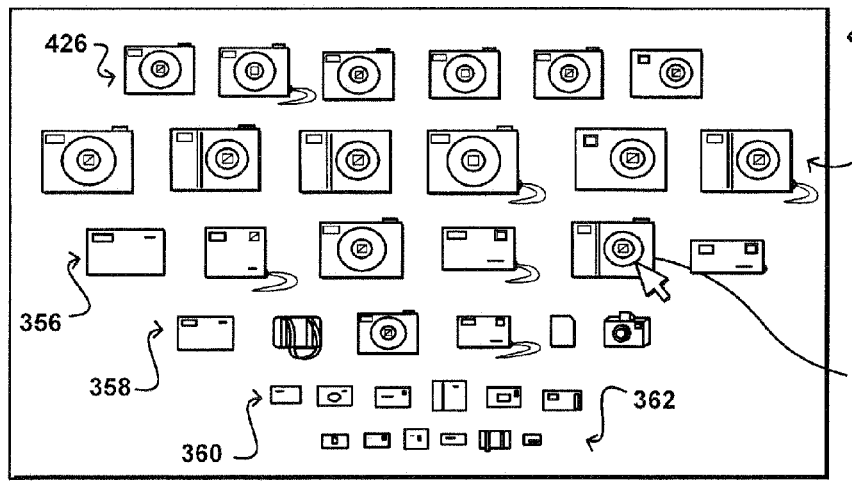

In one embodiment, the change illustrated in FIG. 4(a) happens when the user selects an item located in a previous row that was used to generate the subsequent search results. FIG. 4(b) illustrates an example display 420 that can be presented when the user selects a different result 402 from a previous result set. When the user selects a different result from a previous result set, all subsequent result sets can be adjusted based at least in part upon the selection. For example, the search results displayed in the search result set 424 can be updated based on the criteria of the newly selected item, and can be displayed as the "current" result set. The search results included in any subsequent result set 426 also can be updated based upon the new selection, and can be resized accordingly. The search results in these "subsequent" result sets can still utilize selection criteria from the other rows or result set selections, but can be updated to match information for the newly selected item from a specific result set. Thus, the system can track selections made at each level, and changing a selection at one level can cause the parameters to be adjusted only for that level, updating the search results for each "subsequent" result set.

Figure 4C:
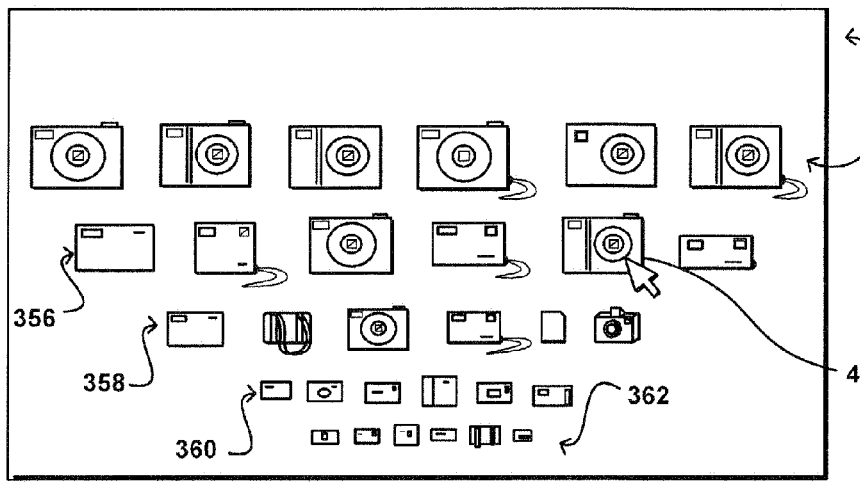

FIG. 4(c) illustrates an example display 440 in accordance with another embodiment, wherein selection of item 422 causes all subsequent result sets to be removed from the display, with only the new result set 424 being displayed. Such an approach can simplify the interface for the user, as the approach in FIG. 4(b) might, in some situations, cause many set of search results to be displayed that are not of interest to the user based on the new search direction. Using the approach of FIG. 4(c), the user can make a new selection from any previous result set and can resume as if the user had made that selection initially for that result set. In some embodiments, the user can have the option of saving the first set of search results, as will be discussed elsewhere herein, and then going back and taking another direction to obtain a different set of search results. Various approaches can be used, such as moving the previous set of search results to a separate portion of the display, storing the search results as a bookmark for later retrieval, etc.

Figure 5A:
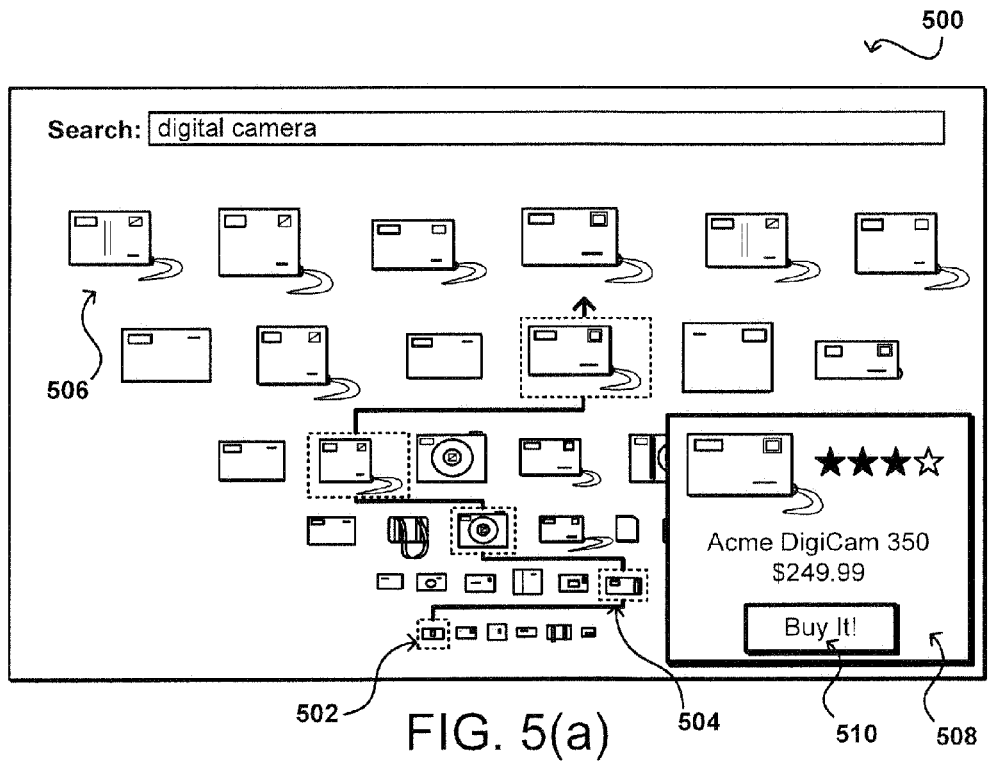
FIGS. 5(a)-5(b) illustrate examples of tracking content navigation in accordance with various embodiments.
Figure 5B:
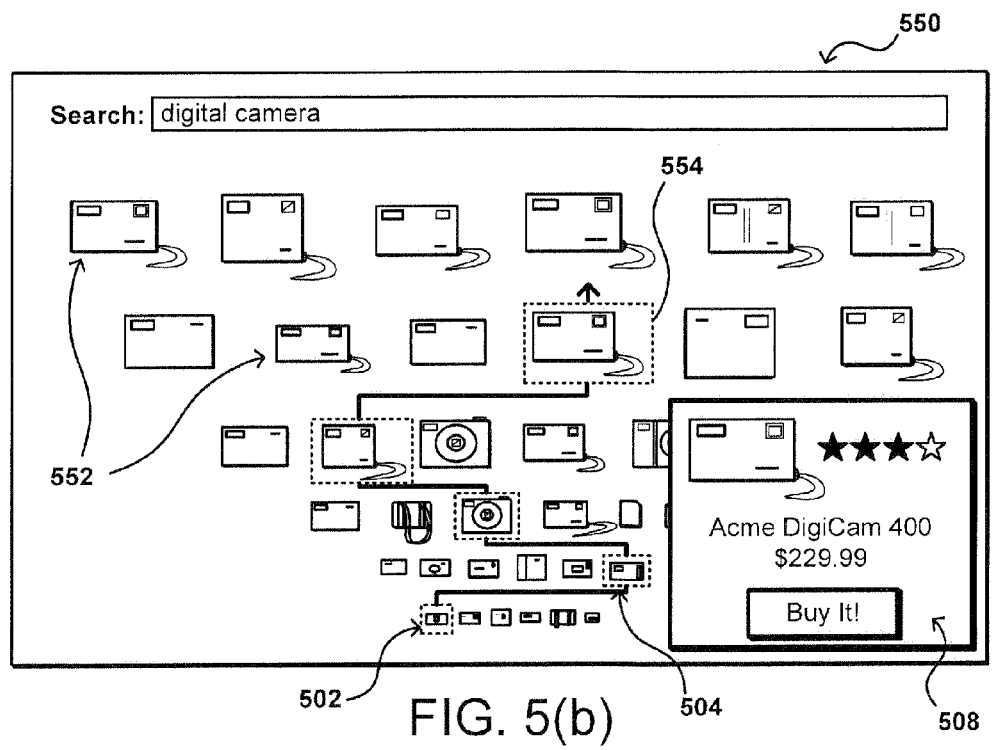

A user may view detailed information about any item within a search result set displayed in the page. FIG. 5(a) illustrates an example display 500 wherein selection of an item 554 in search result set by a user causes display of an information window 508. The information window 508 is shown in FIG. 5(b) as a pop-up (or modal) window or panel that provides detailed information about the selected item and a "buy it!" box 510. The particular position of window 508 is exemplary. The window 508 may be displayed in any portion of display 550. Any appropriate information about the selected item can be displayed in window 508, such as a user rating, price, product information (e.g., images, video, etc.), links to related information (e.g., third party reviews, etc.), and the like. The information displayed in window 508 can be provided from the primary content provider or any appropriate third party.

In some embodiments, the information window 508 will appear any time the user selects an item within a search result. In other embodiments, a user might tap once on an item within a search result set to generate a subsequent result set based on the selected item, and tap twice on the item to view detailed information about the item itself. In other interfaces, a user might click once on an item to view information about the item, and click twice on the item, or right click, to generate an additional result set. In other cases, selecting an item might cause the display of both information about the item and a subsequent result.

Further, the interface 500 can include at least some indication of the user selections at each level to assist the user in understanding, or at least remembering, the choices at each level and the reason for the subsequent result set(s). For example, FIG. 5(a) shows a selection box 502 (or similar highlighting method) highlighting the item selected within each search result set. This example also illustrates a path 504 between each selected item, tracing out the path between each selected item in each search result set. The path also can be an interactive element in some embodiments, wherein a user can "drag" the path 504 to include one or more different selections, in order to modify the subsequent result sets. In some embodiments, the item along the path will stay the same at each level, and the other search results in each set can change. In other embodiments, each result at the subsequent levels can change, and the "selected" item along the path can update to the item closest to the previous selection. Various other approaches can be used as well as should be apparent.

The path (or set of selections) for a user search can be saved to a user computer or system database, for example. Saving a path would allow a user to later retrieve the path and result sets. The user could also share the path/result sets with others, such as by sending a link to the saved path in an email message to another user and/or posting the path to a social networking site. In some cases, a path can also be used to recommend items to other users. For example, if a user types in a search query and a saved paths exists that is related to the query, the system can present one or more paths as options, or can suggest paths based on one or more previously saved or presented paths. In some embodiments, the system can generate suggested "subsequent" result sets based on previous user selections or paths. These suggested sets can include any appropriate number of rows, or other set display approaches, but in at least some embodiments can be shown to be smaller than the current result set in order to distinguish the suggestions from user-generated search results. Such an approach can help a user quickly locate the item (or type of item) of interest, as several sets can be generated and displayed based on popularity and/or other such information as may be based on other user selections and/or paths, and the user can simply jump directly to the item of interest.

Another advantage of storing paths (or selections) is that a user can use a saved path to generate search result sets. If new items have been entered into the catalog since the last time the user used the path, the new catalog items will be displayed. For example, FIG. 5(b) illustrates the same path 504 used in FIG. 5(a) may include new search results at one or more levels since the path was last executed. In this way, a user researching a type of product might store a path that highlights the aspects most important to that user, and the user can check the available items periodically to see new or similar items. In this example, it can be seen that there are a couple of items 552 that were not displayed in the previous result sets for the same path. Further, the selected item is updated to the newer version of the selected item, although certain embodiments might not change the actual user selection(s).

In another example, the user might store a path for accessories for a certain item. For example, the user might enter a search query for a gaming console, and select the console that the user owns. The user might select related items that correspond to accessories and/or games, including specific types of games at different result levels. A user could store this path, and come back at a subsequent time to see new items at each level that satisfy those criteria. For example, a result set might include action/adventure games for that console, particularly that are similar to games that the user as selected, and the user can come back periodically to check for new games that match the user's interest.

Figure 6:
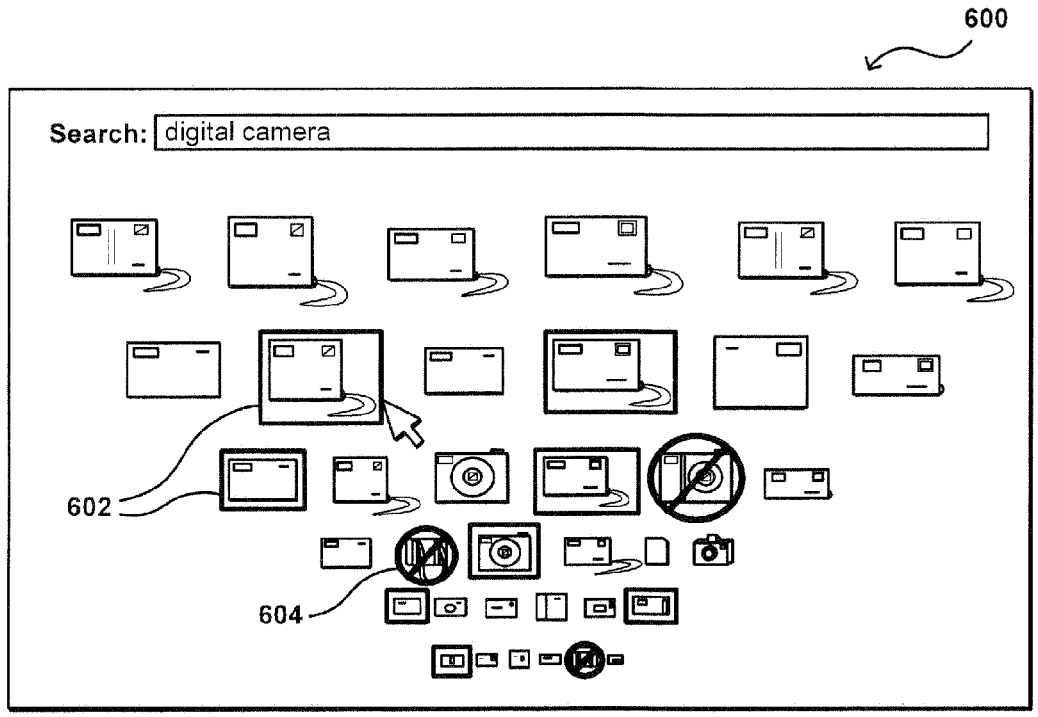
FIG. 6 illustrates an example of a selecting content to be used in determining additional content to display in accordance with various embodiments.

In some cases, there might be multiple items of interest to the user within a search result set. FIG. 6 illustrates an example interface 600 wherein a user has selected multiple items within each search result set. In this example, each selected item is surrounded by a rectangle 602, although any appropriate mechanism for indicating such a selection can be used as well, such as highlighting, increasing image size, animating, etc. When a user selects more than one item in a result set, the system can combine the attributes from the selected items to generate the subsequent result set.

FIG. 6 also illustrates that the user can also exclude items from a result set. Excluded items are shown in FIG. 6 as items covered by an image 604 consisting of a circle with a line there through (although other approaches can be used), indicating that the item was excluded from the search. While some embodiments might remove excluded items from a search result set, displaying excluded items in a result set can help the user easily identify items marked not of interest, and make changes as appropriate (e.g., remove the exclusion sign if the user later decides the item is of interest). When generating result sets, the system can attempt to determine features of the excluded item(s) that are different from the selected item(s), and adjust the query that generates the next search result set appropriately. Users can select to include or exclude items by making different selection actions, such as any of those discussed or suggested herein or known in the art. As discussed above with respect to paths, the inclusion or exclusion of certain items from result sets can be saved for later retrieval and/or use.

Figure 7:
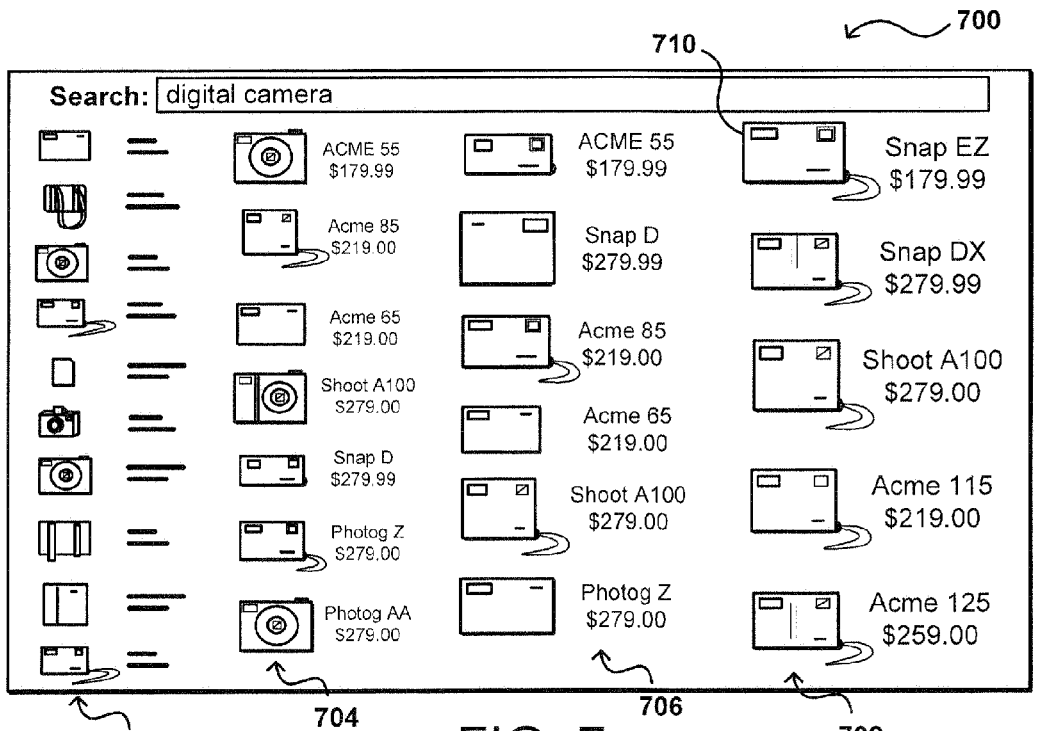
FIG. 7 illustrates an alternative example of a display of additional content that can be provided in accordance with various embodiments.

The result sets may be displayed in other formats than those shown in FIGS. 3-6. For example, FIG. 7 illustrates an interface 700 that displays vertically oriented search result sets 702, 704, 706, 708. Using the FIG. 7 example, search result set 708 is the "primary" or current search result set and search results sets 702, 704, 706 are previously generated search result sets. Search result set 702 is the oldest prior search result set that is still viewable on display 700 and search result set 706 is the second most recently generated search result set. In the FIG. 7 example, product information is displayed along with each image (e.g., image 710 is the Snap EZ camera and sells for $179.99).

Similar to the display 600 shown in FIG. 6, the sets of search result images shown in FIG. 7 decrease in size as the search result set becomes less relevant to the current search results set. FIG. 7 further illustrates that each search result set may not include the same number of images within the set. For example, each search result set 702-706, when it was the current search result set, may have initially displayed only the top five products in its set due to space restrictions of the display 700. However, as the search result set moved from the current set to a previously-generated set (e.g., to the left in display 700), which causes the size of each image in the set to decrease, the number of top products displayed in the search result set can increase accordingly. In the FIG. 7 example, the search result set 702 now displays ten products compared to initially displaying only five when set 702 was the current set (e.g., as being displayed by set 708). Such an approach can increase the total number of products displayed concurrently in the display screen 700, and can assist the user in quickly locating information of interest.

Figure 8:
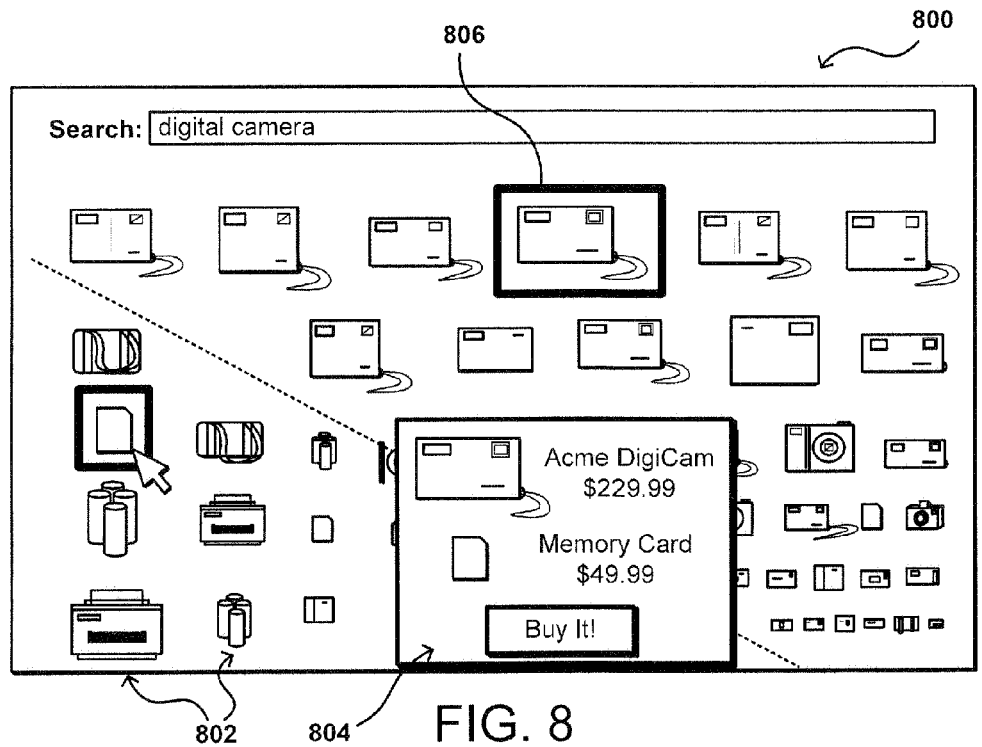
FIG. 8 illustrates an example of a display of additional content, as well as related content, that can be provided in accordance with various embodiments.

FIG. 8 illustrates a display 800 that presents search results sets of products in a first area of display 800 and search result sets of accessories related to the products displayed in the search result sets in a second area of the display 800. In the FIG. 8 example, search result sets of products are displayed horizontally in rows in the first area and search result sets of accessories are displayed vertically in the second area. For example, the most recently generated search result set of products (the top row in the first area) includes a number of similar digital cameras and the most recent search result set of accessories (the left-most column in the second area) displays accessories that relate to items in the most recently generated search result set.

In some embodiments, selecting a specific item in a result set can also cause the displayed accessories to update. In this example, selecting a specific item 806 in the most recent result set can cause the accessories in the corresponding column to update such that the accessories likely match, correspond to, or work with the selected item. The information window 804 can be configured to display multiple selected items, such that a user can select related items (such as a digital camera and a memory card that works with the camera) directly from the displayed search results, and can purchase the items directly from the information window 804. Such display can be advantageous in other areas, such as clothing, where a user can put together and look at potential outfit combinations, such as a shirt with a pair of pants, shoes that match particular shirts, etc., before making a purchase.

In some embodiments, the secondary area can be used to show alternate views of a selected item in a corresponding result set. For example, if a user selects a digital camera then the secondary area can be used to show alternate views of the camera (e.g., front and back) and can show other images or information as well, such as sample images captures using that camera. If multiple cameras are selected in different rows, for example, the user can compare the quality of images in different columns taken with those different cameras. Such functionality is not readily available with conventional search interfaces.

In some embodiments, the secondary area can instead be used to display a separate array of result sets, such as may have been generated in a previous search. The user can compare various items from the different searches. For example, a user looking for televisions could do one search for plasma televisions and one search for LCD televisions, and could cause the result sets to be displayed concurrently such that the user can compare items from both searches. In some embodiments, the user can display at least a portion of any number of previous search results, etc.

Figure 9:
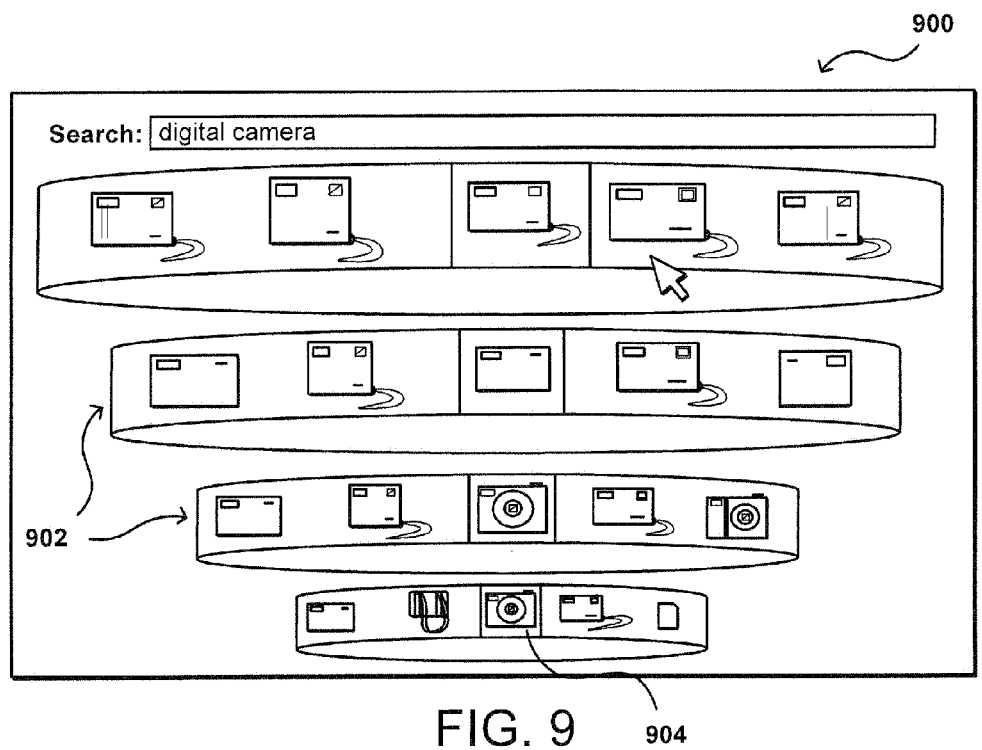
FIG. 9 illustrates an alternative example of a display of additional content that can be provided in accordance with various embodiments.

FIG. 9 illustrates another example approach 900 that can be used in accordance with various embodiments. In this example, each result set is presented on a virtual "wheel" 902 that can be rotated right or left (in the figure) to view items from the result set and select an item to use to generate the next result set, such as by placing the selected item at the center-front position of the wheel (with respect to the view of the display). Such an approach can be advantageous at least for the reason that a user can quickly navigate through more search results at each level than would be possible due to the limited space on the page, and can adjust search results in an intuitive fashion by spinning the wheels at any level and seeing how the search results for subsequent sets change. As should be apparent from the present disclosure, and of a number of other display approaches can be used within the scope of the various embodiments.

Figure 10:
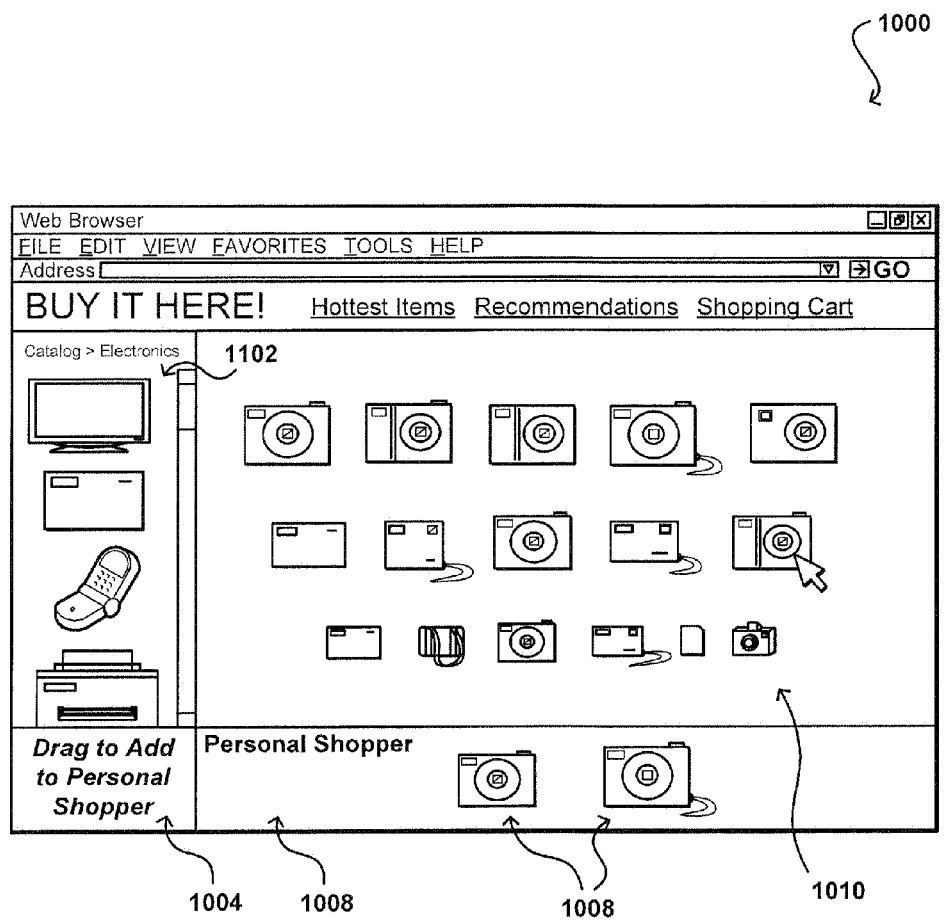
FIG. 10 illustrates an example of an interface for determining additional content to be displayed that can be used in accordance with various embodiments.

In various embodiments discussed above, the initial set of search results was generated in response to a search query. As mentioned, however, the initial set of search results, or the starting point from which subsequent result sets are generated, can be determined using any of a number of other such approaches. For example, a user can navigate to a specific category or set of information using conventional approaches, such as hyperlinks or other content navigation elements. FIG. 10 illustrates an example interface 1000 that includes an item container 1006, in this online retail example referred to as a "personal shopper," where a user can add or select items to be used in generating the result sets. In this interface, a user can navigate to specific categories or pages of information that are displayed in a particular panel, frame, or other section 1002 of the page. Items or other content can be displayed in that section 1002, and a user can select or "drag-and-drop" those items into the container 1006 to be used as a starting point for the search. The page can include instructions 1004 that indicate to the user how to place items 1008 in the container 1006. The container can refer not only to a section of the page that displays selected items, but also to memory or storage space where information identifying the selected content is stored, such as a row in a temporary table, etc. While a user can select items from one or more sections of the page, it should be apparent that a user could also drag-and-drop, (or copy-and-paste, etc.) items from separate windows or displays onto the container in various moments. Various other selection elements can be used as well.

Each time a user adds, removes, or changes an item 1008 in the container 1006, a set of search results 1010 can be generated and/or updated. The search results displayed can be set-based search results, such as are described elsewhere herein. In this example, however, a user does not start with a query composed of keywords, for example, but instead selects items of interest and causes the system to automatically search for items or content related to the item(s) in the container. In this example, a user could navigate to a camera page, and drop into the container two cameras of interest to the user. The system could then utilize these cameras to attempt to locate related items, and can generate a first set of search results in response thereto. The user then can utilize the result sets as discussed above, such as to use the rows of images to refine the search results until one or more items of interest are located, etc. As in other embodiments, the selections in the container (and any selection for corresponding result sets) can be stored for later retrieval by the user, such as to view new related items, send to other users, etc.

In some embodiments, a user might add items to the container that the user has purchased, such as a television and a receiver. Using such an approach, the user can instantly receive hundreds of recommendations for accessories or other items that persons owning those items have also purchased. This not only provides a quick way for a user to determine compatible accessories, for example, but also provides a level of quality as these items were likely the most-purchased or most highly-rated type of each accessory. Such an approach allows a user to rely upon the research and knowledge of others when viewing information.

As mentioned, the selections made by users interested in specific items also can be tracked and used to recommend items to other users. The selection information also can be sold to retailers or product manufacturers, for example, to determine features that user desire, which related items are of interest, which items users viewing a product end up purchasing, etc. This information can be product-specific and not include any personally-identifiable information. In some embodiments, a user can opt-in or opt-out of such information gathering and analysis.

Figure 11:
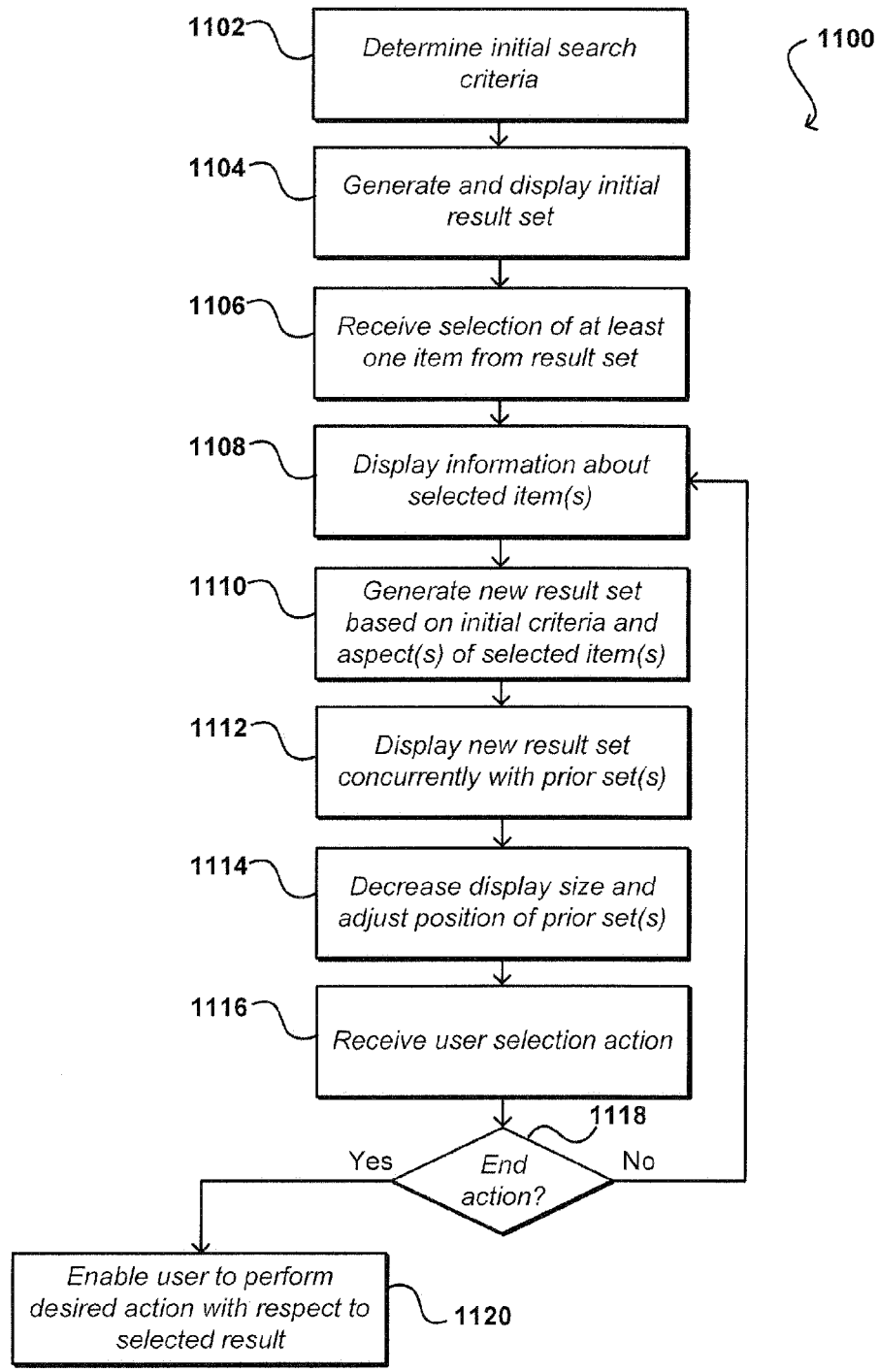
FIG. 11 illustrates an example of a process for determining additional content to be displayed that can be utilized in accordance with various embodiments.

FIG. 11 illustrates an example process 1100 for generating search results in accordance with one embodiment. It should be understood that there can be additional, fewer, or alternative steps performed in similar or differing orders, or in parallel, within the scope of the various embodiments. In this example, initial criteria are determined that will be used to search for information 1102. As discussed, the initial criteria can be determined in any of a number of ways, such as receiving a search query from the user, receiving a selection of items from the user, analyzing the contents of a container, etc. Based at least in part upon the initial search criteria, an initial set of search results can be generated and caused to be displayed to the user 1104. In some embodiments, this comprises a client device (or server in communication with a client device) generating and submitting a search request to a search server that is operable to utilize at least one search index to locate content related to the parameters of the search request. The search results then can be conveyed back to the client device for display using any approach discussed or suggested herein.

After the initial set of search results is displayed to the user, a selection of at least one of the items of the initial set by the user is received 1106. In response to the selection, information about the selected item can be displayed, such as in an information window or similar location 1108. Further, a new result set can be generated based at least in part upon the initial search criteria and one or more aspects of each selected item 1110. The new result set can be displayed along with at least a portion of any prior result sets 1112, with the prior result sets being shifted in position and/or decreased in size 1114 to indicate that those sets are no longer the current set. Various other approaches for providing such indications can be used as well, and the actions can be done in any order or concurrently in various embodiments.

At any appropriate time after the display sets are generated and displayed, a user selection action can be indicated and/or received 1116. A determination can be made as to whether the selection action is an "end action" or a selection action intended to refine or update the displayed search results 1118. If the action is an end action, such as an action to follow a link to a page about an item or to purchase an item, then the user can be enabled to perform that desired action with respect to the selected item(s) 1120. If the selection action is instead a selection action to refine search results, such as to generate a new result set or update an existing set, the information about the selected item(s) can be displayed and/or updated 1108, the new set of search results can be generated 1110 and displayed 1112, the other result sets can be shifted or resized as necessary 1114, and the process can continue. Various other actions can occur as well in various embodiments, such as loading, saving, or modifying selection paths; starting new search result sets for comparison; and various other such functionality.

The initial criteria discussed above can include information in addition to product or query information, etc. For example, preference information can be stored for a user that indicates specific attributes that are of interest, or not of interest, for a user. For example, a user might have indicated that the user will not purchase items with a rating lower than two stars out of four, or some other such criterion. A user also could specify information such as preferred manufacturers, retailers not to purchase from, etc. Any such information could be utilized as search criteria to select search results to display to the user.

Various other information can be used as well. For example, a user's viewing and/or purchase history can be used to select search results. If a user always looks at a certain manufacturer, or never buys anything with a particular feature or aspect, then those types of information can be factored in as well. If a user has a wish list or items saved in a shopping cart, aspects of those items can also be indicative of preferences of the user, and information about those aspects can be considered during the search. Various other types of information, such as geographic information, demographic information, etc., can be used to select items that might be most appropriate for the user. For example, a user shopping for cameras in Alaska might receive search results that are also resistant to low temperatures, while a user in Hawaii might instead receive search results that are waterproof, etc. Further, a user who always buys expensive or designer items, or always buys only the latest items, can potentially receive different selections from users who typically wait to buy an item until the item is on sale or has dropped in price. If a user's size is known and the user is searching for clothing, then search results could be filtered based on items that are available in the user's size. Various other aspects can be used as well as should be apparent to one of ordinary skill in the art in light of the teachings and suggestions contained herein.

Such an interface also can be used for various other reasons, such as to provide other types of recommendations to a user. For example, a user browsing movies might add to a container a set of movies that the user enjoys. Based on information such as movies that other users watched or purchased based on those selections, the system can generate a result set of related movies. If a user selects a specific movie of the generated result set, such as a horror movie, the user can get a subsequent set of search results relating primarily to honor movies (or at least movies that appeal to fans of that particular horror movie). If a user instead wants to watch a romance movie, the user can change a selection at any appropriate level to a romance movie, and any or all of the subsequent search results can update automatically in response to the change. Such an approach can advantageously allow a user to view hundreds of movie recommendations just by changing one or two selection options. A user also can return to the suggestions periodically, as new recommendations can appear over time based on the user's selections, preferences, etc.

A visual interface for navigating content also can be used advantageously for other types of content, such as images. For example, a user might be looking for a picture of a Tuscan villa for a school project. Using conventional search techniques, a user might enter a search query such as "Tuscan villa." Such an approach typically relies upon the name the user gave the image, or context of the page which contains the image. Often, the image will be named something that only means something to the user, such as "Joes place," or will have a default name given by the camera, such as "DXP002353.jpg." Neither name is helpful in guiding the user to that result via a text-based search. Using an interface as described herein, however, a user can attempt to navigate to a desired image based on related images. For example, the user might still type in the query "Tuscan villa." The user might get back images, of Italian food, villas outside Tuscany, etc. The user can select the image that is closest to the desired image, such as an image of an Italian castle. Based on aspects of the image, such as context, coloring, brightness, associated text, user viewing history, linked images, or any of a number of other such factors, another set of image search results can be generated that likely is closer to the user's interest, such as may include a number of Italian castles and villas. The user can continue to select images that are closer to the desired image until the user finds an image of interest. Using conventional keyword searching, the user might never have located the desired image, as the context or other attributes of the image might not be apparent to the user.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   receiving a search query from a user device;
   causing a first set of search result images to be displayed on the user device, the first set of search result images matching at least a portion of the search query;
   receiving information indicative of a selection of at least one search result image of the first set of search result images to yield a selected search result image;
   identifying a second set of search result images relating to the selected search result image; and
   causing the second set of search result images to be displayed more prominently than, and concurrently with, the first set of search result images on the user device, the first set of search result images being displayed on the user device more prominently than, and concurrently with, a previously-generated third set of search result images generated prior to the first set of search result images.

2. The computer-implemented method of claim 1, further comprising:
   receiving information indicative of subsequent selections of search result images displayed on the user device, wherein the search result images are members of a respective previously-generated set of search result images.

3. The computer-implemented method of claim 2, wherein when information indicative of subsequent selections is received,
   causing a respective subsequently-generated set of search result images corresponding to each subsequent selection to be displayed based at least in part upon the subsequent selection of at least one search result image in a previously-generated set of search result images, each search result image of the respective subsequently-generated set being related to the selected search result image of the previously-generated set; and
   causing each of the previously-generated sets of search result images to be readjusted so that they can be displayed on the user device concurrently with the respective subsequently-generated set of search result images such that at least a portion of the readjusted previously-generated sets of search result images are displayed less prominently than the respective subsequently-generated set of search result images.

4. The computer-implemented method of claim 3, wherein displaying the readjusted previously-generated sets of search result images less prominently than the respective subsequently-generated set of search result images is performed using an animated motion.

5. The computer-implemented method of claim 3, wherein each search result image corresponds to an item offered for consumption through an electronic marketplace, and wherein each subsequently-generated set of search result images is based at least in part upon a product related to at least one search result image selected from a previously-generated set of search result images.

6. A computer-implemented method comprising:
    generating for display a first set of search results corresponding to at least one criterion;
    receiving information indicative of a selection of at least one of the search results;
    generating for display a second set of search results corresponding at least in part to the selected at least one search result; and
    causing the second set of search results to be displayed more prominently than the first set of search results, the first set of search results being displayed more prominently than a third, previously-generated, set of search results.

7. The computer-implemented method of claim 6, further comprising:
    generating multiple sets of search results to be displayed concurrently such that the more recently-generated set of search results corresponds to at least one search result of the previously-generated set of search results, wherein the multiple sets of search results are generated until at least one desired search result is obtained.

8. The computer-implemented method of claim 7, further comprising:
    in response to receiving information indicative of a selection of a respective search result from any of the multiple sets of search results other than the most recently-generated set of search results, updating the search results of any subsequently-generated set of search results and displaying the updated search results.

9. The computer-implemented method of claim 6, wherein the at least one criterion corresponds to at least one keyword of a query.

10. The computer-implemented method of claim 6, wherein the at least one criterion corresponds to items added to a container.

11. The computer-implemented method of claim 10, further comprising:
    receiving information corresponding to items, from multiple sources, added to the container.

12. The computer-implemented method of claim 7, further comprising:
    receiving information associated with a selection of multiple search results from the multiple sets of search results; and
    responsive to the selection of multiple search results, causing a subsequently-generated set of search results, based at least in part upon information for the multiple results, to be displayed.

13. The computer-implemented method of claim 6, further comprising:
    receiving information associated with an exclusion of at least one search result from each set of search results; and
    responsive to receiving information associated with the exclusion of at least one search result, causing a subsequently-generated set of search results, based at least in part upon information for each excluded search result, to be displayed.

14. The computer-implemented method of claim 6, wherein displaying the readjusted previously-generated sets of search results less prominently than the most recently-generated set is performed by adjusting at least one of a size or position, color, color depth, transparency, or rendering of the readjusted previously-generated result sets of search results.

15. A system comprising:
    a processor; and
    a memory device including instructions that, when executed by the processor, cause the processor to:
    generate for display a first set of search results corresponding to at least one criterion;
    receive information indicative of a selection of at least one of the search results;
    generate for display a second set of search results corresponding at least in part to the selected at least one search result; and
    cause the second set of search results to be displayed more prominently than, and concurrently with, the first set of search results, the first set of search results being displayed more prominently than, and concurrently with, a previously-generated third set of search results.

16. The system of claim 15, wherein the instructions when executed further cause the processor to:
    generate multiple sets of search results to be displayed concurrently such that the more recently-generated set of search results corresponds to at least one search result of the previously-generated set of search results, wherein the multiple sets of search results are generated until at least one desired search result is obtained.

17. The system of claim 16, wherein the instructions when executed further cause the processor to:
    in response to receiving information indicative of a selection of a respective search result from any of the multiple sets of search results other than the most recently-generated set of search results, update the search results of any subsequently-generated set of search results and display the updated search results.

18. The system of claim 17, wherein the instructions when executed further cause the processor to:
    display a path between at least some of the multiple sets of search results, the path indicating the selected result of a corresponding set of search results.

19. The system of claim 17, further comprising:
    storing information for the selected results for subsequent retrieval of updated results matching the stored information.

20. The system of claim 19, further comprising:
    recommending results to other users based at least upon the stored information.

* * * * *